US012731376B2

(12) United States Patent
Hansson et al.

(10) Patent No.: US 12,731,376 B2
(45) Date of Patent: Sep. 8, 2026

(54) METHODS FOR AUTOMATICALLY GENERATING A TRAINING DATASET FOR TRAINING AN OPTICAL RECOGNITION MODEL FOR READING STREET SIGNS

(71) Applicant: QUALCOMM Incorporated, San Diego, CA (US)

(72) Inventors: Benjamin Per Hansson, Linköping (SE); Karl Olof Erik Wernholt, Linköping (SE); Carl Per Gunnar Ekman, Linköping (SE); Patrick Hiemsch, Linköping (SE); Akshay Gurudath, Linköping (SE); Shirdi Manjunath Adigarla, Linköping (SE)

(73) Assignee: QUALCOMM Incorporated, San Diego, CA (US)

( * ) Notice: Subject to any disclaimer, the term of this patent is extended or adjusted under 35 U.S.C. 154(b) by 262 days.

(21) Appl. No.: 18/442,329

(22) Filed: Feb. 15, 2024

(65) Prior Publication Data

US 2025/0265812 A1 Aug. 21, 2025

(51) Int. Cl.
*G06V 10/764* (2022.01)
*G06T 7/11* (2017.01)
(Continued)

(52) U.S. Cl.
CPC .............. *G06V 10/764* (2022.01); *G06T 7/11* (2017.01); *G06V 10/82* (2022.01); *G06V 20/70* (2022.01);
(Continued)

(58) Field of Classification Search
CPC ...... G06V 10/764; G06V 10/82; G06V 20/70; G06V 30/10; G06V 20/582; G06T 7/11;
(Continued)

(56) References Cited

U.S. PATENT DOCUMENTS

2008/0101726 A1* 5/2008 Myers .................... G06V 20/63 382/289
2020/0356794 A1* 11/2020 Dean ....................... G06F 40/20
(Continued)

FOREIGN PATENT DOCUMENTS

CN 113159212 A 7/2021
CN 112418304 B * 10/2021 ........... G06F 18/214
(Continued)

*Primary Examiner* — Jennifer Mehmood
*Assistant Examiner* — Vaisali Rao Koppolu
(74) *Attorney, Agent, or Firm* — Polsinelli LLP

(57) ABSTRACT

Various embodiments include methods for generating image datasets for training an artificial intelligence machine learning (AI/ML) optical character recognition (OCR) model. Image processing may be performed on a plurality of roadway images to identify street signs within the images and generate a dataset of sign images categorized into sign variants of the same shape, color, pictogram, and characters. An OCR model may process sign images to obtain OCR results for images of each sign variant. An aggregation process may be performed on the OCR results for all sign images within each sign variant to identify a ground truth OCR result for each sign variant. The ground truth OCR result may be used to automatically label all sign images of each sign variant to produce an OCR model training dataset. The produced training dataset may then be used to retrain the initial AI/ML OCR model and/or train other AI/ML OCR models.

20 Claims, 10 Drawing Sheets

(51) Int. Cl.
*G06V 10/82* (2022.01)
*G06V 20/70* (2022.01)
*G06V 30/10* (2022.01)

(52) U.S. Cl.
CPC .... *G06V 30/10* (2022.01); *G06T 2207/20081* (2013.01); *G06T 2207/20084* (2013.01); *G06T 2207/30252* (2013.01); *G06T 2210/12* (2013.01)

(58) Field of Classification Search
CPC . G06T 2207/20081; G06T 2207/20084; G06T 2207/30252; G06T 2210/12
See application file for complete search history.

(56) References Cited

U.S. PATENT DOCUMENTS

| | | | | |
|---|---|---|---|---|
| 2023/0075493 | A1* | 3/2023 | Kabkab | G06V 20/582 |
| 2024/0062555 | A1* | 2/2024 | Xu | G06V 20/63 |

FOREIGN PATENT DOCUMENTS

| | | | | | |
|---|---|---|---|---|---|
| CN | 113963329 | A | | 1/2022 | |
| CN | 114550125 | A | * | 5/2022 | G06F 18/241 |
| CN | 115690797 | A | | 2/2023 | |

* cited by examiner

METHODS FOR AUTOMATICALLY GENERATING A TRAINING DATASET FOR TRAINING AN OPTICAL RECOGNITION MODEL FOR READING STREET SIGNS

BACKGROUND

Autonomous vehicles with self-driving capabilities are the future. Self-driving systems must identify and correctly interpret road signs, such as speed limits, lane change warnings, passing and no passing zones. At a high level there are two processes involved in understanding street signs: sign object recognition (recognizing the shape and color of a sign and equating the shape to a meaning or category), and understanding the text or numbers on the sign, which involves optical character recognition (OCR). OCR techniques employed in self-driving systems may use artificial intelligence/machine learning (AI/ML) models trained on a training dataset of images or video that include street signs viewed from various angles and distances.

SUMMARY

Various aspects include methods that may be implemented in a computing device for turning a dataset of street sign images into a training dataset for training an artificial intelligence machine learning (AI/ML) optical character recognition (OCR) model. Various aspects may include performing image processing on a plurality of roadway images to identify street signs within the images and generate a dataset of street sign images categorized into a plurality of sign variants, in which each sign variant exhibits same or similar shape, colors, pictograms, and characters, processing the dataset of street sign images using an AI/ML OCR model to obtain OCR results for each sign image of each sign variant, performing an aggregation process on the OCR results for all sign images within each sign variant to identify a single correct OCR result for each sign variant, automatically labeling all sign images of each sign variant with the identified single correct OCR result to produce an OCR model training dataset, and training an AI/ML OCR model using the produced OCR model training dataset.

In some aspects, performing image processing on a plurality of roadway images to identify street signs within the images may include applying a bounding box that encompasses each sign image, and processing the dataset of street sign images using an AI/ML OCR model to obtain OCR results for each sign image of each sign variant may include applying the AI/ML OCR model to characters that appear within each sign image bounding box.

In some aspects, processing the dataset of street sign images using the AI/ML OCR model to obtain OCR results for each sign images of each sign variant may include processing the dataset of street sign images using a partially trained AI/ML OCR model, and training an AI/ML OCR model using the OCR model training dataset may include further training the partially trained AI/ML OCR model using the produced OCR model training dataset.

In some aspects, performing the aggregation process on the OCR results for all sign images within each sign variant to identify a single correct OCR result for each sign variant may include identifying as the single correct OCR result the OCR result produced for a majority of the sign images in each sign variant. In some aspects, performing the aggregation process on the OCR results for all sign images within each sign variant to identify a single correct OCR result for each sign variant may include using a probability associated with each OCR result to identify the single correct OCR result for each sign variant. Some aspects may further include filtering the OCR results obtained for each sign image of each sign variant to remove from further evaluation OCR results that are incorrect.

In some aspects, processing the dataset of street sign images using the AI/ML OCR model to obtain OCR results for each sign images of each sign variant may include processing the dataset of street sign images using a fully trained AI/ML OCR model, and training an AI/ML OCR model using the OCR model training dataset may include training a different AI/ML OCR model using the produced OCR model training dataset.

In some aspects, processing the dataset of street sign images using the AI/ML OCR model to obtain OCR results for each sign image of each sign variant may include using a trained neural network to process visual embeddings for the images of text lines on sign images, using principal component analysis (PCA) to reduce dimensionality of the embeddings, and clustering the embeddings into clusters of text lines with the same text.

In some aspects, performing the aggregation process on the OCR results for all sign images within each sign variant to identify a single correct OCR result for each sign variant may include comparing OCR results to a dictionary of words that appear on street signs.

Further aspects include processing system including a memory and at least one processor configured to perform operations of any of the methods summarized above. Further aspects may include a computing having various means for performing functions of any of the methods summarized above. Further aspects may include a non-transitory processor-readable storage medium having stored thereon processor-executable instructions configured to cause one or more processors of a processing system to perform various operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
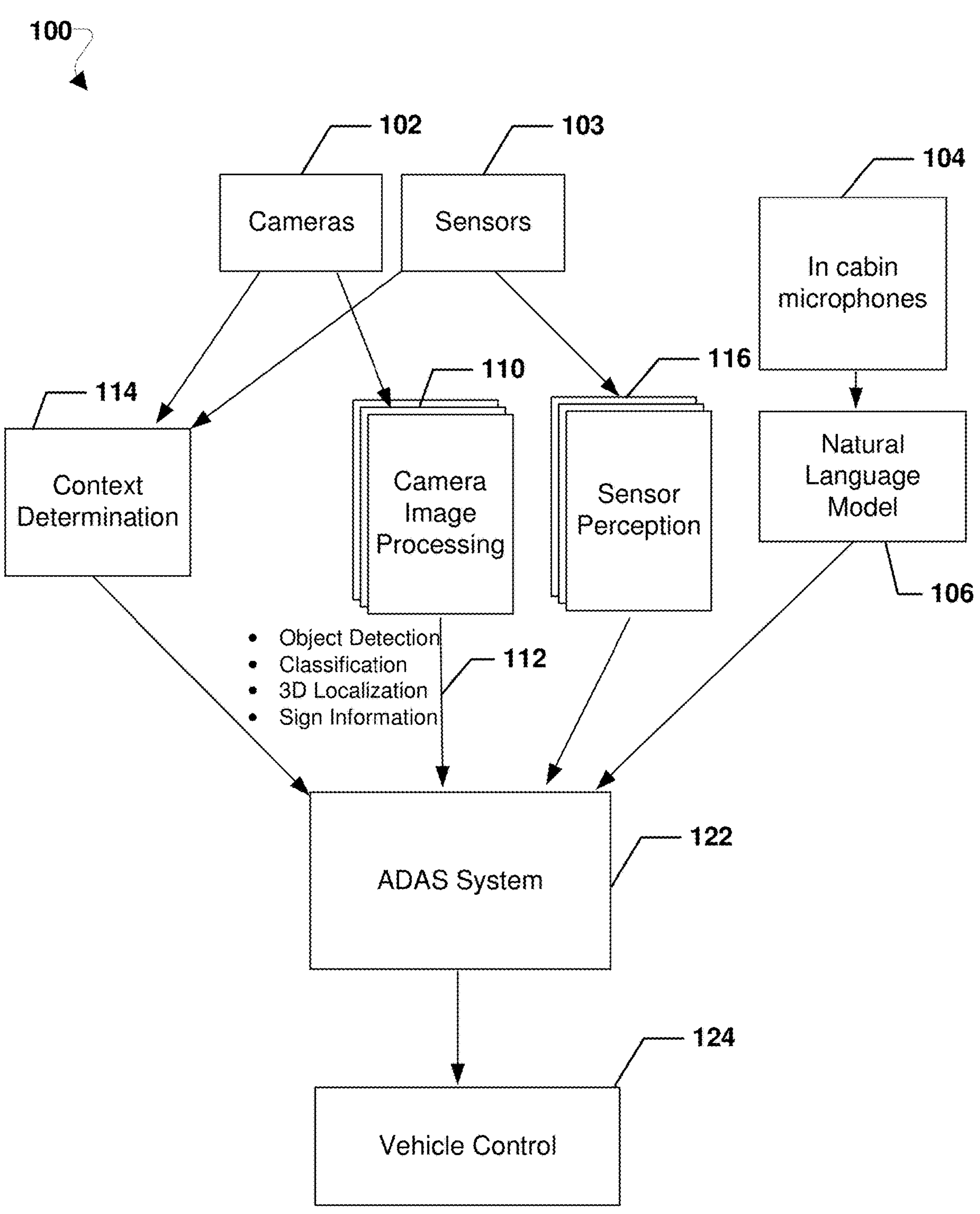
FIG. 1 is a component block diagram illustrating a system typical of an autonomous vehicle.

Various embodiments will be described in detail with reference to the accompanying drawings. Wherever possible, the same reference numbers will be used throughout the drawings to refer to the same or like parts. References made to particular examples and embodiments are for illustrative purposes and are not intended to limit the scope of the claims.

Various embodiments include methods and computing devices implementing the methods for turning a dataset of street sign images into a training dataset for training an artificial intelligence machine learning (AI/ML) optical character recognition (OCR) model. Various embodiments may include performing image processing on a plurality of roadway images to identify street signs within the images and generate a dataset of street sign images categorized into a plurality of sign variants based on shape, colors, pictograms, and characters, processing the dataset of street sign images using an AI/ML OCR model to obtain OCR results for each sign image of each sign variant, performing an aggregation process on the OCR results for all sign images within each sign variant to identify a single correct OCR result for each sign variant, and automatically labeling all sign images of each sign variant with the identified single correct OCR result to produce an OCR model training dataset. The produced training dataset may then be used to train or retrain an AI/ML OCR model.

As used herein, the term "processing system" is used herein to refer to one or more processors, including multi-core processors, that are organized and configured to perform various computing functions. Various embodiment methods may be implemented in one or more of multiple processors within any of a variety of computing devices as described herein.

The term "vehicle" is used herein to refer to any of a variety of devices, system and equipment that may use camera vision systems to recognize or interpret the meaning of street signs. Some non-limiting examples of vehicles to which various embodiments may be applied include autonomous and semiautonomous vehicles, mobile robots, mobile machinery, autonomous and semiautonomous farm equipment, autonomous and semiautonomous construction and paving equipment, autonomous and semiautonomous military equipment, and the like.

The term "neural network" is used herein to refer to an interconnected group of processing nodes (e.g., neuron models, etc.) that collectively operate as a software application or process that controls a function of a computing device or generates a neural network inference. Individual nodes in a neural network may attempt to emulate biological neurons by receiving input data, performing simple operations on the input data to generate output data, and passing the output data (also called "activation") to the next node in the network. Each node may be associated with a weight value that defines or governs the relationship between input data and activation. The weight values may be determined during a training phase and iteratively updated as data flows through the neural network.

Camera systems and image processing play critical roles in current and future autonomous and semiautonomous apparatuses, such as the autonomous driving systems (ADS) or advanced driver assistance systems (ADAS) implemented in autonomous and semiautonomous vehicles, mobile robots, mobile machinery, autonomous and semiautonomous farm equipment, etc. In such applications, multiple cameras may provide images of the roadway and surrounding scenery, providing data that is useful for navigation (e.g., roadway following), object recognition, collision avoidance, and hazard detection. The processing of image data in modern ADS or ADAS systems has progressed far beyond basic object recognition and tracking to include understanding information posted on street signs, understanding roadway conditions, and navigating complex roadway situations (e.g., turning lanes, avoiding pedestrians and bicyclists, maneuvering around traffic cones, etc.).

In modern ADS and ADAS systems, camera images may be processed by multiple different analysis engines in what is sometimes referred to as a "vision pipeline." To recognize and understand the scene around a vehicle or other apparatus, the multiple different analysis engines in a vision pipeline may employ neural network type artificial intelligence/machine learning (AI/ML) modules that are trained to perform different analysis tasks on image data and output information of particular types. For example, trained AI/ML analysis modules in a vision pipeline may include a model trained to perform semantic segmentation analysis on individual images, a model trained to perform depth estimates of pixels, groups of pixels and areas/bounding boxes on objects within images, a model trained to perform object detection (i.e., detect objects within an image), a model trained to perform object classification (i.e., determine and assign a classification to detected objects), and a model trained to recognize and understand text and numbers appearing in images, including street sign images. Such trained AI/ML analysis modules may analyze image frames and sequences of images to identify and interpret objects in real-time. The information outputs of these image processing trained models may be combined to generate a data structure of information to identify and track objects with camera images (e.g., in a tracked object data structure) that can be used by the ADS or ADAS processors to support navigation, collision avoidance, and following traffic procedures (e.g., traffic signs or signals).

An important operation achieved through processing of image data in a vision pipeline is object detection and classification (i.e., recognizing and understanding the meaning or implications of objects). In addition to detecting objects, the location of detected objects in three-dimensions (3D) with respect to the vehicle is important for navigation and collision avoidance. For example, the types of objects that ADS and ADAS systems may require to be identified, classified, and interpreted or understood include traffic signs, pedestrians, other vehicles, roadway obstacles, roadway boundaries and traffic lane lines, and roadway features that differ from information included in detailed map data.

Traffic signs are a type of object that autonomous vehicle applications need to recognize, categorize, and process to understand displayed writing (e.g., speed limit, traffic flow instructions, etc.). This processing is needed to enable the guidance and regulations identified by the sign to be included in the decision-making of the autonomous driving system. Typically, traffic signs have a recognizable shape depending upon the type of information that is displayed (e.g., stop, yield, speed limit, etc.). In addition to recognizing street signs, the meaning of the signs must be understood by the ADS or ADAS system, which may be accomplished by performing OCR processing on street sign images.

For OCR processing, an AI/ML OCR model may be trained to process each image of a sign to recognize the letters and numbers present on the sign. The AI/ML model training requires a training dataset of images that have been annotated or labeled to indicate where in the image the OCR process should be performed, and the correct result of the OCR process, referred to as the "ground truth" information.

AI/ML OCR models are trained by the AI/ML model processing the training dataset to produce OCR results that are then compared to the ground truth information. The training process compares each OCR output to the labeled ground truth information associated with each image to determine an error or "difference" that is fed back in the training process. Feeding back the error or "difference" between the OCR output and the ground truth for each image enables the training process to adjust neural network links and weights in the model so as to minimize the error or difference. This output vs. correct result comparison, difference feedback, and neural network weights adjustment incrementally reduces the difference, causing the OCR output to approach the ground truth for each image. Repeating this training process over hundreds of images in the training process leads to a trained AI/ML OCR model that will reliably output correct OCR results.

Conventionally, such training datasets are generated by people looking at images, drawing the bounding box and typing in the correct OCR result. However, a training dataset containing many thousands of images featuring many different viewing, lighting and sign conditions representative of sign images is needed to train an AI/ML OCR model sufficiently to achieve recognition accuracy levels that satisfy safety standards for deployed self-driving systems. Using human-annotated methods to generate a sufficiently large training dataset with sufficient examples of various viewing angles, lighting conditions, sign conditions, etc. would take a long time and be cost prohibitive.

Various embodiments solve the cost problem associated with generating a sufficiently large training dataset for traffic sign OCR processes for use in autonomous driving systems. Various embodiment methods automatically generate an annotated training dataset of sufficient numbers of sufficiently diverse sign images by using an aggregation process to identify the correct OCR result (i.e., numbers/letters) for a given street sign variant and then using that selected correct OCR result to annotate or label all images of that same street sign variant to produce an updated/fully annotated training dataset. This process reduces human annotation investments.

Various embodiments involve transforming a dataset of street sign images into a training dataset for an artificial intelligence (AI)/machine learning (ML) optical character recognition (OCR) model. The training dataset may then be used for training AI/ML OCR models to accurately recognize and process street sign images, which are useful for various applications, such as autonomous driving systems or traffic management. The generation of a comprehensive and diverse dataset of street sign images involves multiple stages, including image processing, OCR model application, aggregation, and labeling, which work collectively to create a high-quality training dataset that can be used to train and/or fine-tune AI/ML OCR models.

In various embodiments, an initial image processing operation may be performed categorizing sign images into a plurality of sign variants. This image processing may be performed in a batch process to generate an intermediate dataset of street sign images that have been recognized and classified into sign variants with bounding boxes on the sign images. Thus, in an initial image processing operation, roadway images that include street signs are processed with an image processing model that recognizes street signs in the images, locates the signs within dimensions of the images by applying a bounding box, and categorizes each sign image as being one of a number of sign variants based on the shape, colors, pictograms, and characters (text or numbers) on the sign. The term "pictogram" is used herein to refer to any shape displayed on a sign that is not a number or letter, such as arrows (e.g., indicating a bend in the road), lane markers (e.g., indicating merging or diverging lanes), figures (e.g., shapes indicating people walking), objects (e.g., a wheelchair, falling rocks, drawbridge, etc.), and combinations thereof. Signs that include a pictogram may or may not include characters.

A sign variant includes all sign images having the same shape, color, pictogram, and text/number content. For example, all yellow triangular signs with rounded corners containing the letters "YIELD" would be grouped in one variant, while the same shaped sign with the same letters but white or another non-yellow color would be grouped as another variant. As another example, all yellow triangular signs with rounded corners containing a pictogram of a person in a crosswalk would be grouped in one variant, while square signs containing a pictogram of a person in a crosswalk would be grouped in one variant. As a further example, all eight-sided street signs with a red color and the letters "STOP" would be grouped in one variant, while a sign with the same shape and color but the letters "HALT" would be grouped in another variant.

The image processing techniques used in this initial image processing involve applying one or a combination of computer vision algorithms and/or machine learning models to analyze roadway images and identify street signs within the images. These techniques aim to street signs within the images by identifying sign boundaries and shapes using edge detection and feature extraction methods. Additionally, color-based segmentation methods can be employed to distinguish between different sign variants based on their colors.

To support the OCR process, this initial image processing may place a bounding box around each sign. This processing may be performed using any of a number of image processing methods, including AI/ML image processing models trained to categorize sign images based on visual characteristics. This image processing operation may output a dataset of images in which each street sign is located with a bounding box and sorted into or identified as one of a plurality of sign variants.

Some embodiments may include a filtering step or process within the sign recognizing initial image processing operations. This filtering step or process may exclude from further processing images that cannot be reliably categorized into a sign variant. In some embodiments, filtering may be accomplished by the initial image processing categorizing unrecognizable sign images as "unable to assign." In some embodiments, filtering may be accomplished by removing such images from the dataset of images. In some embodiments, filtering may be accomplished by not identifying an unrecognizable street sign, such as not attaching a bounding box to such sign images, thus removing the image from further processing by the AI/ML OCR model and inclusion as a labeled sign in the large training dataset. This filtering or unlabeling of unrecognizable or misshapen sign images may prevent processing of images that would otherwise add to confusion or inconsistent OCR results.

Next, the dataset of street sign images is processed using an AI/ML OCR model that is trained to output an OCR result for each sign image. An AI/ML OCR model (e.g., a neural network) that is used to perform OCR processing on street sign images needs to be trained with some data to recognize numbers and/or text in street sign images. This initial training may be accomplished using a limited human-annotated or synthetic training dataset. This initial OCR model can recognize numbers and text in some signs, though it may not exhibit acceptable reliability for use in ADS or ADAS systems in autonomous vehicles.

The accuracy of OCR results produced by an AI/ML OCR model for sign images may be impacted by viewing angle, lighting conditions, sign conditions, etc. To achieve satisfactory performance in terms of reliable and accurate OCR processing of street signs under real life conditions, a deployed AI/ML OCR model needs to be trained to produce accurate OCR results under a broad range of viewing angle, lighting conditions, sign conditions, etc. Various embodiments generate an OCR training dataset based on a large number of real-life images of signs under various conditions by automatically identifying ground truth information for sign OCR results, thereby accommodating the variability in initial OCR results that may be caused by the variability in image conditions.

A key aspect of various embodiments is that the computing system performs an "aggregation process" on OCR results to identify a single correct OCR result for each sign variant that is then used to automatically annotate or label all sign images of the same sign variant to produce or improve an OCR training dataset. In some embodiments, the computing system runs the initial AI/ML OCR model on the complete training dataset to accumulate every sign OCR result for each sign variant, which are then processed in the aggregation process. This selection of the single correct OCR result may be performed for all sign variants in the large dataset.

The aggregation process may use any of a variety of techniques to select the one correct OCR result, including statistical techniques. In some embodiments, the aggregation process may select as the correct OCR result the text/numbers that is output for the majority of sign images of each sign variant (i.e., selection by majority vote). In some embodiments, the aggregation process may select the correct OCR result by making use of a probability value that the AI/ML OCR model associates with each OCR result. Neural network AI/ML OCR models output "inference" results, which are a most likely value among a range of possible values. Such inference results may include a probability that the output is correct. By taking into account the probability information along with the output of AI/ML OCR processing of a plurality of sign images, the aggregation process may identify the most likely correct OCR result even if that result is only a plurality or weak majority of the OCR results of all sign images of a given variant.

Having performed the aggregation process on the street sign OCR results to select the correct OCR result for each sign variant, the computing system performing the methods may generate or produce the improved dataset by annotating or labeling each image of a street sign with the identified correct OCR result for that sign variant. This labeling of sign images with the identified correct or ground truth OCR results may be performed for all sign variants identified in the initial image processing of the image dataset. In this manner, an extensive training dataset can be generated from thousands of real-world roadway images without the expense and time required for humans to view and annotate all images.

The improved training dataset may then be used to further train the initial AI/ML OCR model. That is, the process of aggregating OCR results for each sign variant to identify the correct result and update the training dataset can be repeated to further improve the OCR training dataset. Thus, the methods can produce a large OCR training dataset before such a dataset is available to fully train a street sign AI/ML OCR model. Such embodiments may use an AI/ML model that is partially trained on a limited OCR training dataset of human-annotated images to recognize text within bounding boxes that encompass recognized street signs, although with an unacceptable level of inaccuracy or inconsistency. In such embodiments, the partially trained AI/ML model can be used to generate a large dataset for training street sign AI/ML OCR processing in an iterative process.

In this iterative process, the OCR outputs of the initial AI/ML OCR model are processed in the aggregation process on multiple images of the same variant to identify a single, most likely correct OCR ground truth result (if possible) that is used to label images of the same variant to produce an initial large training dataset. Since the AI/ML model is partially trained initially, the OCR results on some sign variants may be insufficient to provide a single or accurate OCR result to pass the aggregation process, and thus not all sign variants may be labeled sufficient to train AI/ML models to a required level of accuracy and reliability. To address this, some embodiment methods may be repeated in an iterative manner, in which the AI/ML model is further trained on the produced large dataset, the further trained AI/ML model is applied to the initial large dataset to output OCR results for all sign variants, the aggregation process is performed on the OCR results to identify a single most likely correct OCR ground truth result that is used to label every image of the same sign variant to produce an improved large training dataset. Repeating the OCR processing, aggregation processing, labeling of the dataset, and retraining the AI/ML OCR model improves both the OCR training dataset labeling and accuracy of the AI/ML OCR model. This process may be repeated two or more times to further improve both the OCR training dataset labeling and accuracy of the AI/ML OCR model.

In some embodiments, the methods may be performed to produce a large OCR training database from real-world images by using the AI/ML OCR model that has been fully trained to recognize text on images of street signs. Such embodiments may generate the large OCR training dataset by using the fully trained AI/ML OCR model to perform OCR processing on a large dataset of street signs after the dataset has been processed by a model that recognizes and draws bounding boxes around street signs. The OCR outputs of the AI/ML OCR model are then processed in an aggregation process that disambiguates results for multiple images of the same variant to identify a single, most likely correct OCR ground truth result that is used to annotate or label every image of the same variant to produce a large training dataset. Thus, a trained AI/ML OCR model can be used to generate a large training dataset for training other AI/ML OCR models starting from a large dataset of images without requiring human review and labeling of the images. This large OCR training database can then be used to train other AI/ML OCR models.

Various embodiment methods enable generating a large training dataset of street sign images for training AI/ML OCR models faster and more economically than possible using conventional human review and labeling processing. Thus, a larger training dataset can be generated, which may enable the training of more accurate and reliable AI/ML OCR models suitable for use in autonomous vehicles. Further, various embodiments produce an OCR training dataset that a human can efficiently confirm by sampling a small subset of images because all images are labeled using the same automated processes. Also, various embodiments avoid the variability in labeling of ground truth information that could happen with human labelers.

Various embodiments support the generation of OCR model training datasets that are useful for training OCR models that may be useful in ADS and ADAS systems. ADS and ADAS systems 100 must solve the challenging problems of navigating roadways in a manner that is safe and complies with traffic laws and regulations. FIG. 1 is a functional block diagram illustrating components of an ADS or ADAS management system 100 that may make use of an AI/ML OCR model trained using a training dataset produced by various embodiments. An ADS or ADAS management system 100 may include an ADAS system layer 122 that processes information received from a plurality of components including one or more camera image processing layers 110, a context determination layer 114, a sensor perception layer 116, and a natural language model 106. Vehicle cameras 102 provide images and image data to the camera image processing layers 110. Vehicle sensors 103 provide sensor data to the context determination layer 114, camera image processing layers 110, and the sensor perception layer 116. Auditory data from in-vehicle microphones 104 may be processed by the natural language model 106 to infer meaning of commands and conversations by an operator and other vehicle occupants, such as instructions for the ADS or ADAS system (e.g., destinations, feedback on driving operations, etc.). The ADAS system layer 122 processes the received information to decide how the vehicle should operate and issues commands to the vehicle control layer 124 to control movements of the vehicle.

The content determination layer 114 may determine a current vehicle context, which may be used by the ADAS system layer 122 to select vehicle driving policies for use in the controlling of the vehicle behavior while in operation. The content determination layer 114 may utilize all available data including the identity and number of occupants of the vehicle, a description of a destination, route, roadway and traffic conditions, weather conditions, event and time constraints on the completion of the travel route, and other related data relevant to determining how the vehicle behavior should be controlled.

The sensor perception layer 116 may process information from various vehicle sensors to provide information that the ADAS system layer 122 needs to operate the vehicle safely that is not obtained from vehicle cameras, such as distance and localization information from radar and LiDAR sensors, proximity information from proximity sensors, temperature information from outside and engine thermometers, and other useful information.

The camera image processing layers 110 may perform the processing of images and video provided by vehicle cameras to extract the information regarding the roadway, other vehicles, obstacles, and traffic rules and routing information that the ADAS system layer 122 needs to operate the vehicle safely. Of particular interest to various embodiments, the camera image processing layers 110 may process camera images to detect, recognize and categorize objects along the roadway, including street signs. The camera image processing layers 110 may include an AI/ML OCR model that is trained to perform OCR processing of street sign images to determine the meaning or information on the signs and provide that information to the ADAS system layer 122.

The camera image processing layers 110 may perform multiple processing operations and output 112 to the ADAS system layer 122 a number of different types of information regarding the roadway, other vehicles and the environment in which the vehicle is operating that is required by the ADAS system layer 122. Such processing and information outputs 112 may include recognizing and providing the ADAS system layer 122 with a three-dimensional (3D) map of the roadway, roadway features (e.g., curb and lane marking locations), locations and identification or categorization of objects near the vehicle for navigation and collision avoidance, and of particular relevance to various embodiment, locations and meanings of street signs, as well as the information displayed on street signs. As the ADAS system layer 122 must command the vehicle control layer 124 to operate the vehicle safely while complying with regulations displayed on street signs (e.g., speed limits, traffic flow, right of way, etc.), the OCR processing of street signs may be an important source of information for safe autonomous vehicle operations.

Figure 2:
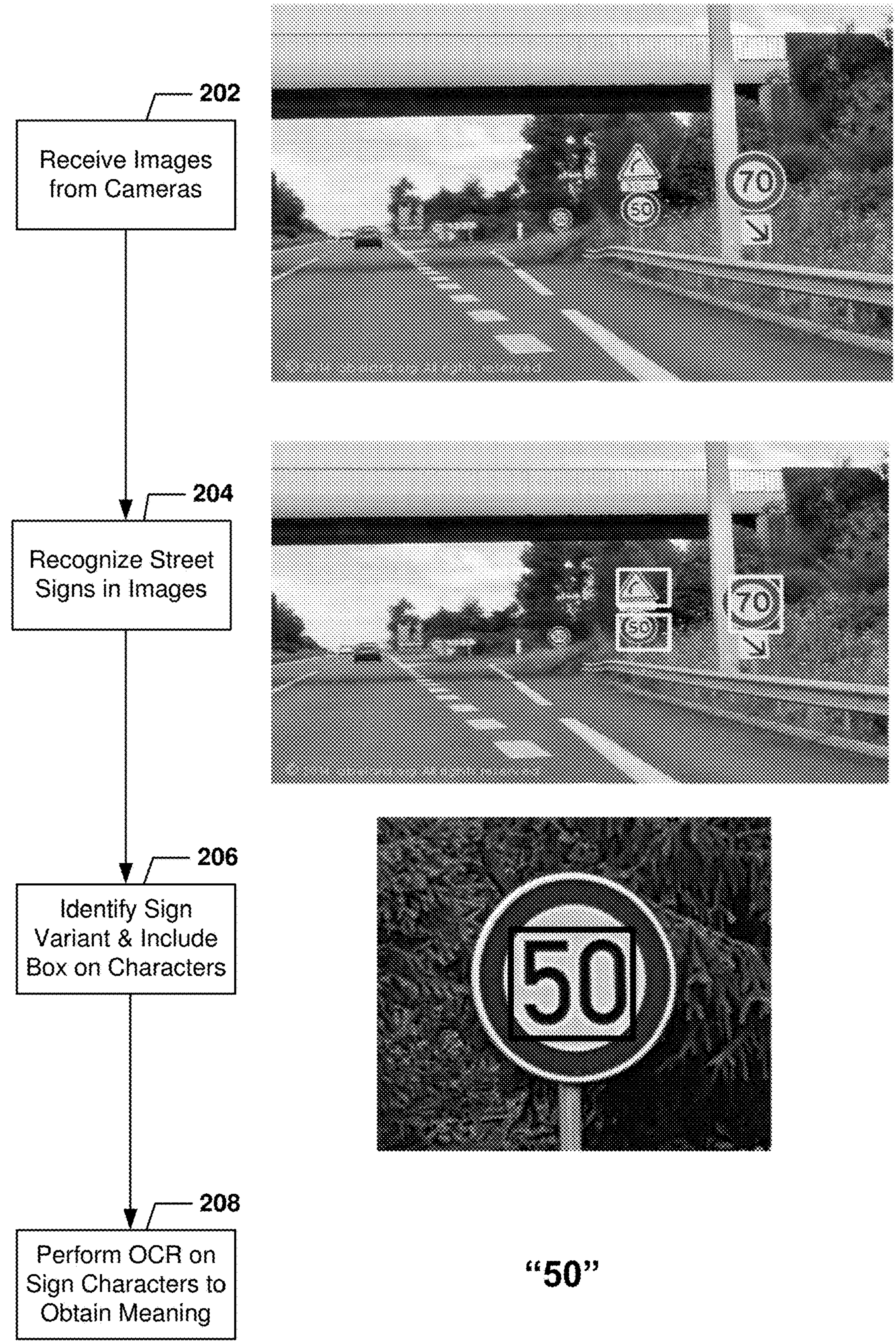
FIG. 2 is a process block diagram illustrating operations involved in OCR processing of street sign images in an autonomous vehicle system.

FIG. 2 illustrates an overview of image processing operations that may be performed by the camera image processing layers 110, including operations involved in OCR processing of street sign images. The image processing techniques used in various embodiments may include applying a combination of computer vision algorithms and machine learning models to analyze roadway images to recognize, localize and categorize roadway features, including street signs. These techniques may identify the boundaries and shapes of various features using edge detection and feature extraction methods. Additionally, color-based segmentation methods may be employed to recognize and categorize various features based on their colors.

In block 202, one of the camera image processing layers 110 may receive images or video streams from one or more cameras. FIG. 2 shows adjacent to block 202 an example of a camera image of a portion of a roadway. As this example shows, an image of the roadway may include dozens of features (e.g., the roadway, lane lines, curbs, barriers, other vehicles and street signs) that need to be recognized, categorized, and located in 3D relative to the vehicle.

Focusing on the processing involved in recognizing, categorizing, and understanding street signs, one or more of the camera image processing layers 110 may be configured or trained to recognize street signs within camera images in block 204. Street signs may be recognized based on their shapes, colors, pictograms, and locations with respect to the roadway (e.g., adjacent or above the roadway, but not in or far removed from the roadway). As illustrated in FIG. 2, the processing involved in recognizing street signs may also include adding to the image data a bounding box that outlines the street sign and defines the location in two or three dimensions within the image. Bounding boxes around street sign images may enable later processing to focus on the image data within the box, ignoring image data outside the box and thus focusing processing resources on the area of most interest for subsequent image processing to categorize a street sign. The processing in block 204 may be performed by a computer vision module and/or an AI/ML model that has been trained on an image training dataset to recognize street signs within an image field and apply a bounding box to portions of the image that include pixels encompassing each recognized street sign.

In block 206, one or more of the camera image processing layers 110 may be configured or trained to process the image data (e.g., pixels) within each street sign bounding box to categorize the street sign and identify the variant to which the street sign belongs. As described, a street sign variant is defined by the shape, colors, visible features (e.g., arrows) and included text or numbers. For example, the images shown in FIG. 2 include five different street sign variants, specifically: a sign featuring an arrow on a colored background indicating a direction of a traffic lane; a circular speed limit sign indicating a 70 kilometers per hour speed limit; a triangular right turn indication sign; a circular speed limit sign indicating a 50 kilometers per hour speed limit; and a circular speed limit sign indicating a 30 kilometers per hour speed limit. While not shown in the black and white rendering of these images, variants of these street signs may also be defined by background and foreground colors.

The processing in block 206 may be performed by a computer vision module and/or an AI/ML model that has been trained on an image training dataset to categorize street signs based on shape, color, visible features (e.g., arrows) and text/numbers within a bounding box encompassing the recognized street sign. In some embodiments, the computer vision module and/or trained AI/ML model may refer to or generate a library of street sign variants, and categorize street signs based on similarity to representative images of each variant. In some embodiments, the computer vision module and/or trained AI/ML model may configured or trained to accommodate variability in sign shape, color, features and text/numbers, such as may occur to signs overtime, so that street signs that are substantially similar but not exactly same as those in a library of street sign variants can be classified into the correct variant.

In block 208, an AI/ML OCR model within a camera image processing layer may be trained to perform OCR processing on the characters (letters and numbers) on the sign to determine their meaning. This OCR processing may focus on the portion of the sign image including text/numbers, and may define a bounding box around the characters as part of the OCR processing. In the illustrated example, the AI/ML OCR model has recognized the sign as including the number "50" and such information may be passed to the ADAS system layer 122 to inform the system about the legal speed limit adjacent to the street sign.

Figure 3A:
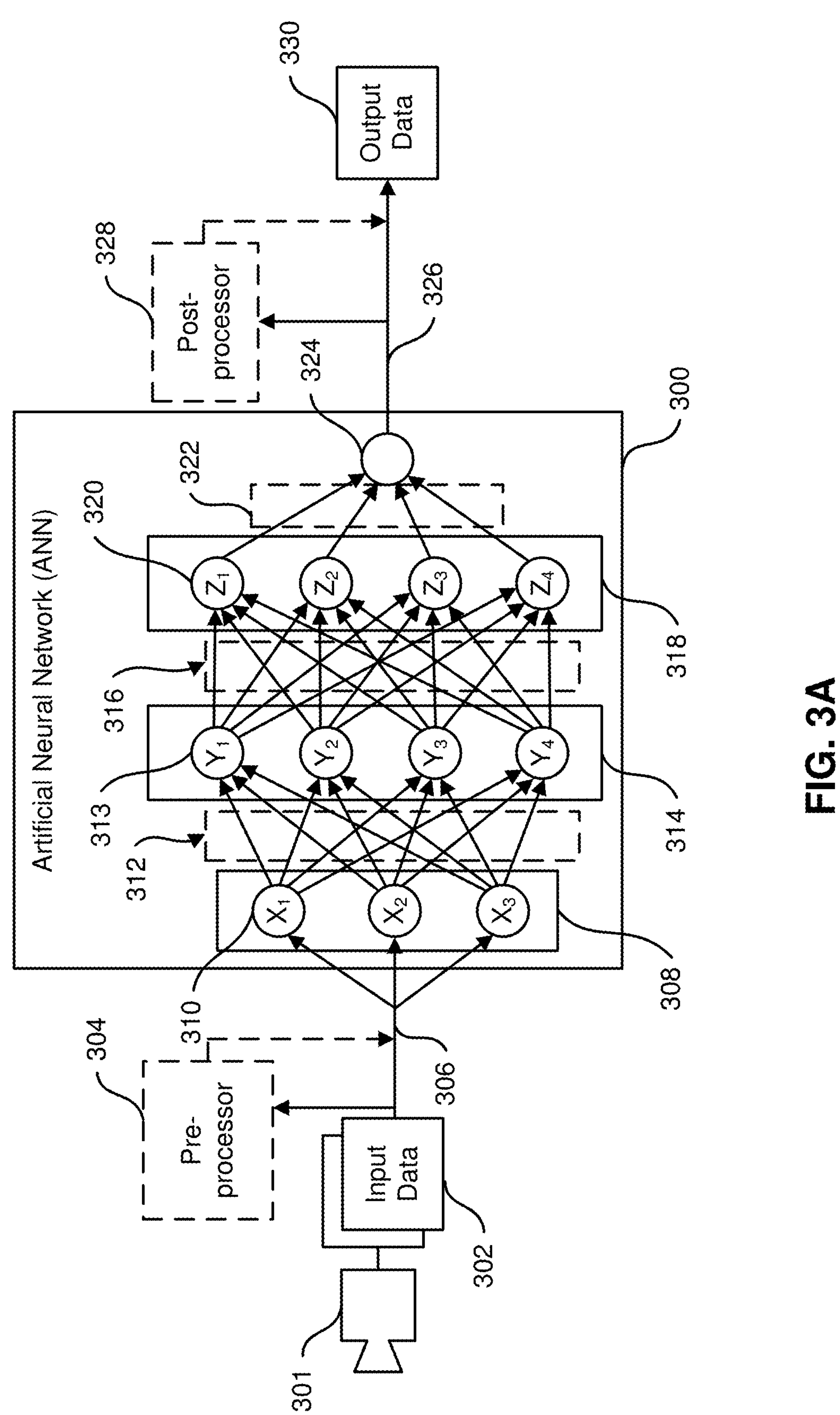
FIGS. 3A-3C are notional block diagrams illustrating elements of a neural network and methods of training a neural network using a training dataset.
Figure 3B:
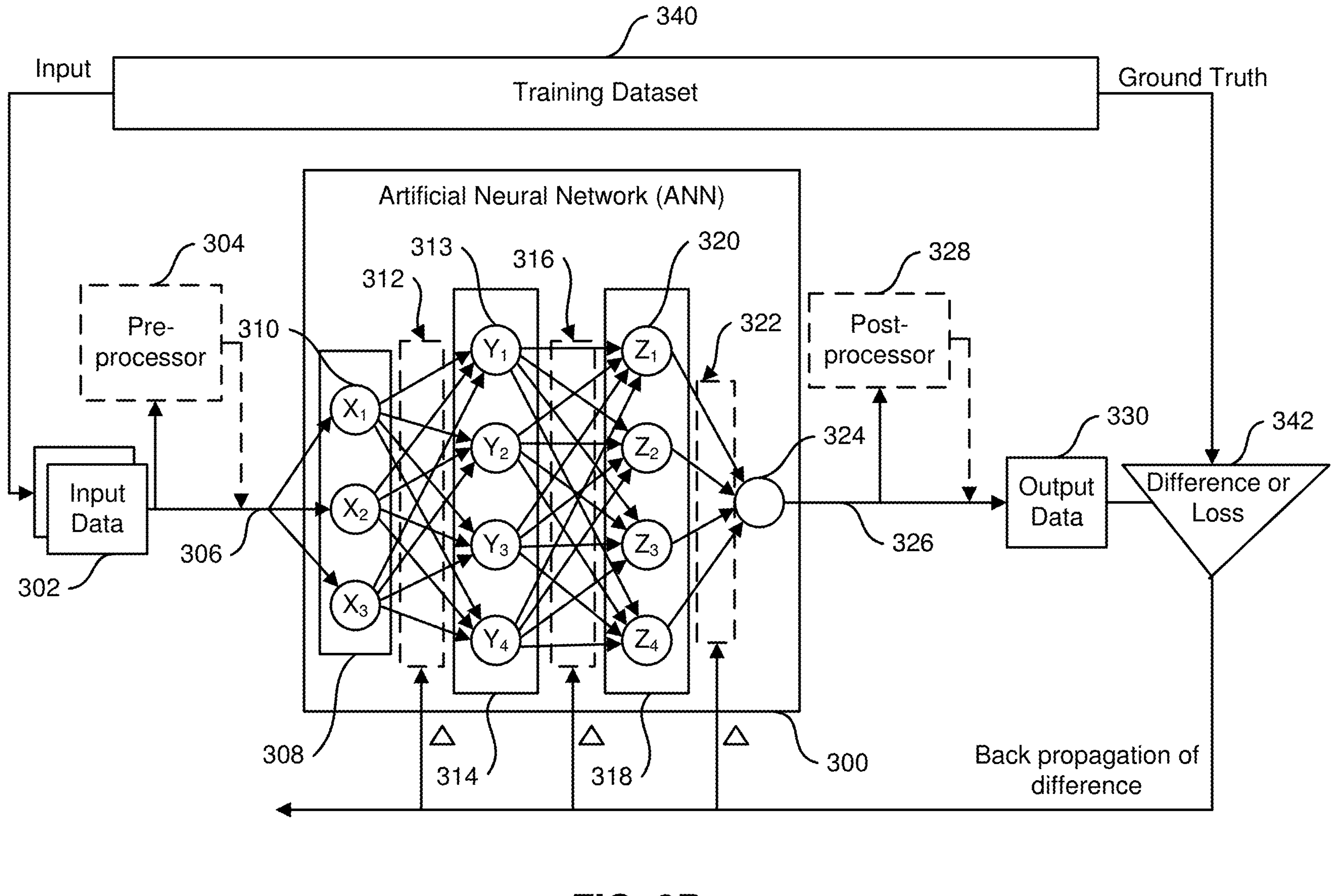
Figure 3C:
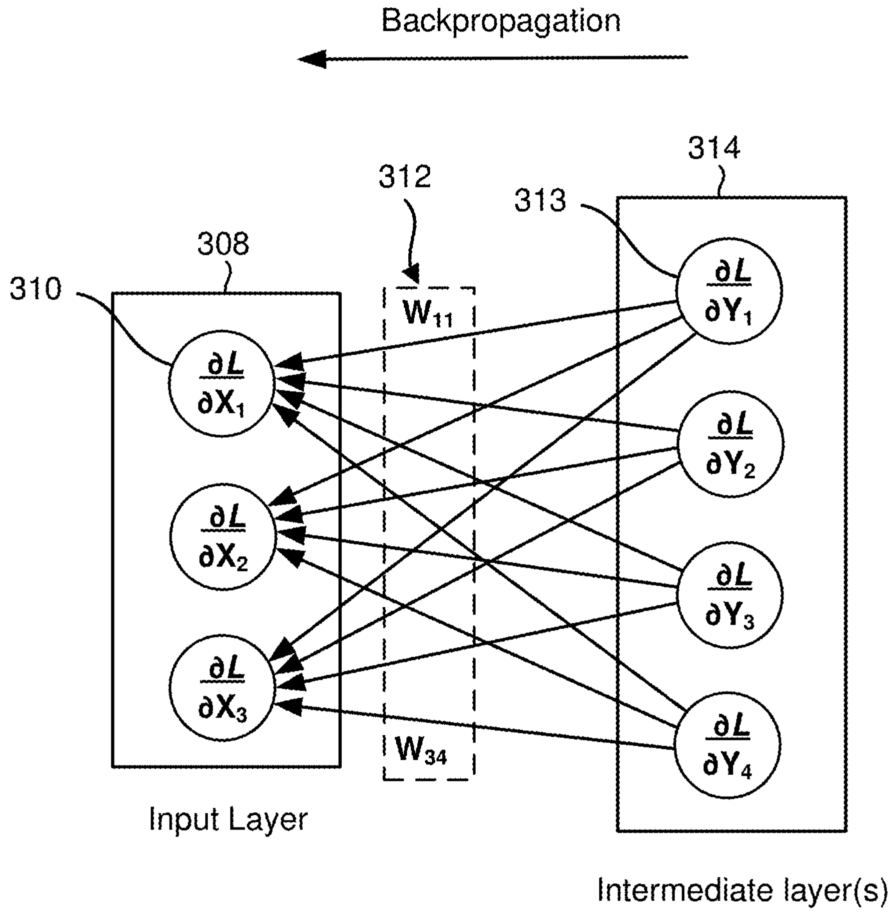

FIG. 3A is a notional block diagram of a neural network 300. FIGS. 3B and 3C illustrate processes for training the neural network 300 using a training dataset that may be produced according to various embodiments. With reference to FIGS. 1-3C, the neural network 300 may include an input layer 308, intermediate layer(s) 314, 320, and an output layer 324. Each of the layers 308, 314, 320, 324 may include one or more processing nodes 310, 313, 320 (labeled as $X_1$-$X_3$, $Y_1$-$Y_3$, and $Z_1$-$Z_3$) that receive input values, perform computations based the input values and weights 312, 316, 322, and propagate the result (referred to as "activations") to the next layer (illustrated as arrows).

In feed-forward neural networks, such as the neural network 300 illustrated in FIG. 3A, the computations are performed as a sequence of operations on the outputs of a previous layer (e.g., 308, 314, 318). The final set of operations generate the output 324 of the neural network, such as a probability that an image contains a specific item (e.g., stop sign, yield sign, speed limit sign, etc.) or information indicating that a proposed action should be taken. Many neural networks 300 are stateless.

The neural network 300 illustrated in FIG. 3A includes fully-connected (FC) layers 308, 314, 318, 324, which are also sometimes referred to as multi-layer perceptrons (MLPs). In a fully-connected layer 308, 314, 318, 324, all outputs are connected to all inputs (illustrated by arrows). Each processing node's activation is computed as a weighted sum of all the inputs received from the previous layer based on weights 312, 316, 322.

Referring to layers 308 and 314 in FIG. 3A, an example computation performed by the processing nodes and/or neural network 300 may be: $y_j=f(\Sigma^3_{i=1}W_{ij}*x_i+b)$, in which $W_{ij}$ are weights (illustrated as matrix 312), $x_i$ is the input to the layer, $y_j$ is the output activation of the layer, f(•) is a non-linear function, and b is bias. For example, the neural network 300 may be configured to receive as input data 302 pixels of an image (i.e., input values) from a camera 301 in the first layer, and generate outputs indicating the presence of different low-level features (e.g., lines, edges, etc.) in the image. At a subsequent layer, these features may be combined to indicate the likely presence of higher-level features. For example, in training of a neural network for image recognition, lines may be combined into shapes, shapes may be combined into sets of shapes, etc., and at the output layer 324, the neural network 300 may generate a probability value that indicates whether a particular object is present in the image.

As illustrated in FIG. 3A, a neural network 300 may be supplemented by pre-processing of input data 302 and post processing of an inference output 326 of the neural network to facilitate the generation of useful output data 330. For example, image input data 301 from a vehicle camera 301 may be pre-processed by a pre-processor 304, such as to crop, enhance, reformat, or otherwise transform raw pixel data into a format suitable for use as an input 306 to the first layer 308. Similarly, the output 326 of the neural network output layer 324 may be post-processed by a post-processor 328 to translate, reformat or otherwise transform the inference into output data 330 that is usable by the ADAS system 112.

The neural network 300 may be trained how to transform input data 302/306 into proper output inferences 326. However, the overall structure of the neural network 300, and operations of the processing nodes and layers 308, 314, 318, 324 do not change as the neural network learns the task. Rather, the training process adjust the values of the weights and bias of each layer so that the correct output inference 326 is produced for a given input 306.

Training the neural network 300 may include causing the neural network 300 to process a task for which an expected/desired output is known, provided as ground truth in a training dataset, and comparing the output generated by the neural network 300 to the expected/desired output (i.e., ground truth). The difference between the ground truth output and the output generated by the neural network 300 is referred to as loss (L) or difference.

FIG. 3B is a notional block diagram of a neural network 300 illustrating the training process. To train a neural network 300, a training dataset 340 is used to provide the input data 302 that is processed by the neural network. As mentioned, the training dataset includes representative data, such as many images of street signs view from a variety of angles under a variety of lighting conditions, that is annotated or labeled with ground truth information that the neural network should produce. In the training process, the neural network 300 receives a training input data, performs the calculations through the various network layers 308, 314, 318, 324 by applying biases and weights 312, 316, 322, to produce an output 326 or output data 330. The output 326 or output data 330 is compared to the ground truth associated with the corresponding input data 302 to calculate a difference or loss 342. This difference of loss is then provided in a back propagation process to the layers and weights in the neural network to provide feedback that is used to adjust the biases and weights of the neural network so as to reduce the difference or loss.

Back propagation may operate by passing values backwards through the network to compute how the loss is affected by each weight. The back propagation computations may be similar to the computations used when traversing the neural network 300 in the forward direction (i.e., during inference). To improve performance, the difference or loss (L) from multiple sets of input data ("a batch") may be collected and used in a single pass of updating the weights.

Many passes may be required to train the neural network 300 with weights suitable for use during inference operations (e.g., when reading street signs during autonomous operation of a vehicle).

An efficient way to compute the partial derivatives of the gradient is through a process called back propagation, an example of which is illustrated in FIG. 3C. Referring to FIG. 3C, during training, the weights ($w_{ij}$) may be updated using a hill-climbing optimization process called "gradient descent." This gradient indicates how the weights should change in order to reduce the difference or loss (L). A multiple of the gradient of the loss relative to each weight, which may be the partial derivative of the difference or loss L with respect to the weight $$\left(\text{e.g., } \frac{\partial L}{\partial X_1}, \frac{\partial L}{\partial X_2}, \frac{\partial L}{\partial X_3}\right),$$

could be used to update the weights 312, 316, 322.

Figure 4:
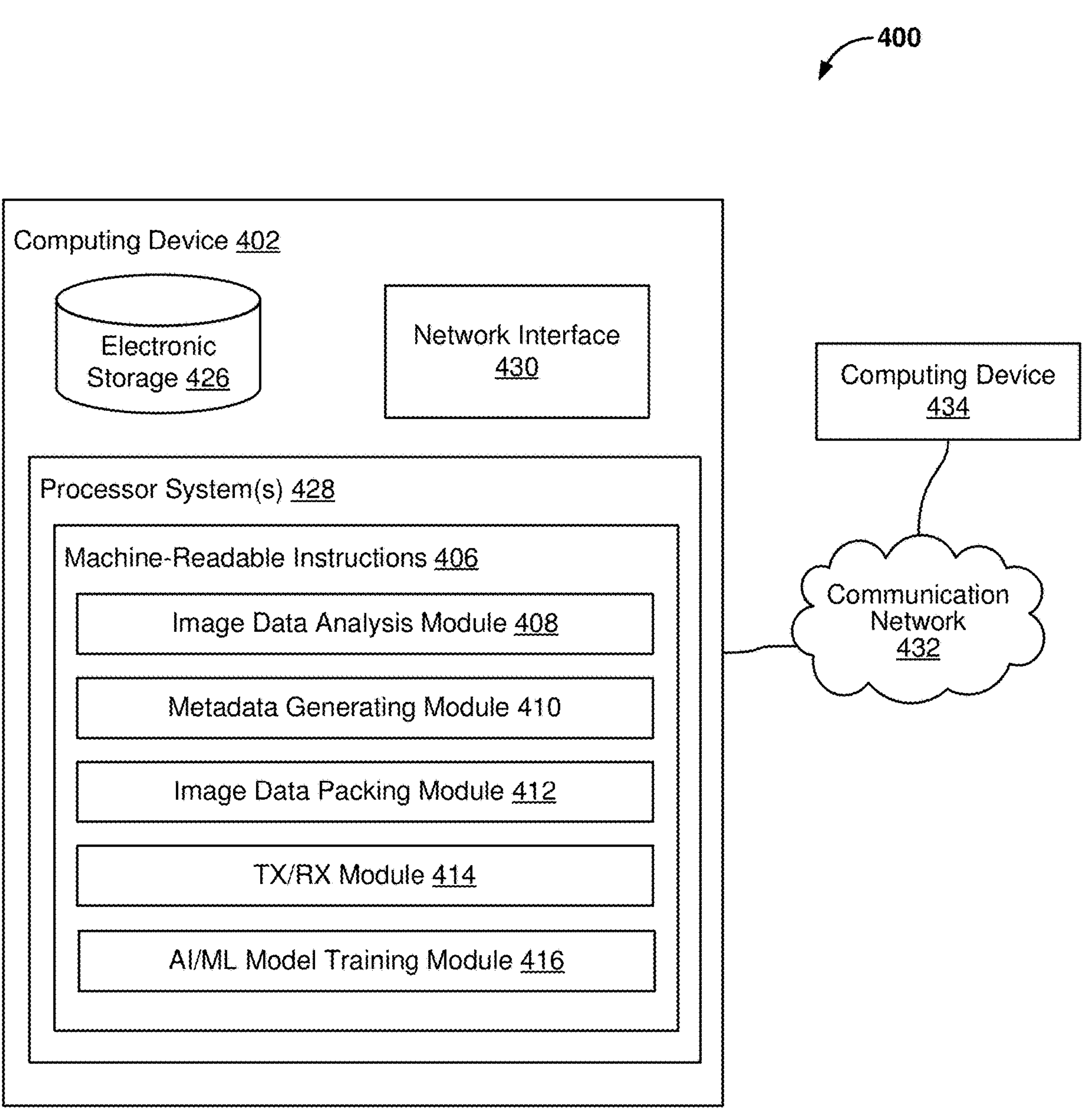
FIG. 4 is a processing block diagram illustrating processing modules of a computing device configured to perform operations of various embodiments.

FIG. 4 is a block diagram illustrating a computing system suitable for turning a dataset of street sign images into a training dataset for training an artificial AI/ML OCR model in accordance with various embodiments. With reference to FIGS. 1-4, the system 400 may include a computing device 402. The computing device 402 may include one or more processing systems 428 coupled to electronic storage 426 and a network interface 430 for receiving and transmitting data via a communication network 432 (e.g., a local area network or the Internet) with a remote computing device 434, such as a server or data repository storing image datasets and/or AI/ML training datasets.

The processing system(s) 428 may be configured by machine-readable instructions 406. Machine-readable instructions 406 may include one or more instruction modules. The instruction modules may include computer program modules. In some embodiments, the functions of the instruction modules may be implemented in software, firmware, hardware (e.g., circuitry), or a combination of software and hardware, which are configured to perform particular operations or functions of various embodiments. The instruction modules may include one or more of an initial image processing module 408, an AI/ML OCR module 410, an aggregation process module 412, an OCR model training dataset labeling module 414, an AI/ML OCR training module 416, or other instruction modules.

The initial image processing module 408 may be configured to perform image processing on a plurality of roadway images to identify street signs within the images and generate a dataset of street sign images categorized into a plurality of sign variants, in which each sign variant exhibits same or similar shape, colors, pictograms (e.g., arrows, roadway diagrams, crosswalk diagrams, etc.) and characters (e.g., numbers and/or letters). For example, the initial image processing module 408 may use computer vision algorithms and/or machine learning models to analyze roadway images to identify street signs by identifying their boundaries and shapes using edge detection and feature extraction methods, as well as color-based segmentation methods to distinguish between different sign variants based on their colors. In some embodiments, the initial image processing module 408 may also be configured to apply a bounding box that encompasses each sign image.

The term "similar" is used herein because the initial image processing module 408 may be configured or trained to accommodate some variability in sign shapes, colors, pictograms and characters when identifying the variant into which a street sign should be categorized. This capability may enable the initial image processing module 408 to correctly categorizing sign images that are similar but not exactly the same shape, color, pictogram and/or characters, such as bent signs, faded colors, pictograms, and different character fonts or character sizes. In some embodiments, the initial image processing module 408 may be configured or trained to categorize street signs into the same variant if the shape, color, pictogram and/or characters differ from a prototypical sign or the majority of categorized signs by less than a threshold difference in shape dimensions or angles, color hues, pictogram shapes, character size, character shape (e.g., font difference), and similar distinguishing features. This ability to accommodate slight differences in street sign images may enable accurate interpretation of street signs as may appear in the real world in which signs may be damaged, faded, soiled, or made slightly differently.

In some embodiments the initial image processing module 408 may be an AI/ML image processing model that has been trained to recognize street signs in vehicle camera images, locate recognized signs within dimensions of the images by applying a bounding box, to each and categorize each sign image as one of a number of variants based on the visual characteristics of the sign. In some embodiments, the initial image processing module 408 may also be configured to filter out (e.g., by removing from the dataset) unrecognizable or misshapen sign images that cannot be reliably categorized into a variant to ensure that only high-quality images are included in the training dataset.

The AI/ML OCR module 410 may be configured to process the dataset of street sign images using an AI/ML OCR model to obtain OCR results for each sign images of each sign variant. In some embodiments, the AI/ML OCR module 410 may be configured to apply the AI/ML OCR model to the characters that appear on each sign image to recognize the text and/or numbers, which may include applying a bounding box that encompasses the recognized characters. In some implementations the AI/ML OCR module 410 may be an initially or partially trained AI/ML OCR model. For example, the AI/ML OCR module 410 may be trained on a limited dataset of street signs that have been labeled by human reviewers. In some implementations the AI/ML OCR module 410 may be an AI/ML OCR model that has been trained one or more times, such as in an iterative manner as described herein.

The aggregation process module 412 may be configured to perform an aggregation process on the OCR results for all sign images within each sign variant to identify a single correct OCR result for each sign variant. For example, the aggregation process module 412 may be configured to collect all of the OCR results for a given sign variant, and perform a process, such as a statistical process, on the collected OCR results that selects one of the OCR results for one or more sign variants as the correct or true output that can be used as the ground truth for all images of the same sign variant. In some embodiments, the aggregation process module 412 may identify as the single correct OCR result the OCR result produced for a majority of the sign images in each sign variant, such as using a majority vote selection method. In some embodiments, the aggregation process module 412 may identify as the single correct OCR result the OCR result with the highest average confidence scores. In some embodiments, the aggregation process module 412 may identify as the single correct OCR result the OCR result with a highest confidence weighted vote score. In some embodiments, the aggregation process module 412 may identify as the single correct OCR result the OCR result that best matches a dictionary of street sign meanings (i.e., text and/or numbers), using a dictionary that may be country, region, or language specific. In some embodiments, the aggregation process module 412 may identify the single correct OCR result using other methods, such as K-Means clustering. In some embodiments, the aggregation process module 412 may involve the processor using a sequence model, such as a Transformer, RNN or LSTM, that is trained to find the best text. In some embodiments, the aggregation process module 412 may use a pretrained natural language processing (NLP) model that is trained to compute word-embeddings for the matched text lines on street signs and use a weighted average (or other arithmetic aggregation) to aggregate the word-embeddings. In some embodiments, the aggregation process module 412 may perform other processing of OCR results to determine the best single OCR result for each sign variant as described herein.

The OCR model training dataset labeling module 414 may be configured to automatically label street sign images of each sign variant with the identified single correct OCR result to produce an OCR model training dataset. This module may automatically label street sign images in the data set with the identified single correct OCR result for each sign variant, thereby avoiding the need for manual labeling. In some embodiments, the OCR model training dataset labeling module 414 may associate with each sign image metadata that includes the ground truth OCR result. In some embodiments, the OCR model training dataset labeling module 414 may link a data field storing the ground truth OCR result with the corresponding street sign image in the training dataset. The OCR model training dataset labeling module 414 may also assemble the final (i.e., labeled) training dataset in a format suitable for use in training AI/ML OCR models for reading street signs in vehicle camera images.

In some implementations, the same computing system that produces the OCR model training dataset may also perform training of AI/ML models using that same dataset. The AI/ML model training module 416 may be configured to train an AI/ML OCR model on the produced OCR model training dataset using known machine learning training methods, such as described with reference to FIGS. 3B and 3C. In some embodiments, the AI/ML model training module 416 may be configured to retrain, further train or refine the AI/model implemented in the AI/ML OCR module 410 using the produced OCR model training dataset, thereby iteratively improving the AI/ML OCR model. In some embodiments, the AI/ML model training module 416 may be configured to recursively perform the operations of modules 408-416 to iteratively improve both the AI/ML model and the produced OCR model training dataset.

The electronic storage 426 may include non-transitory storage media that electronically stores information. The electronic storage 426 may store software algorithms, information determined by processing system(s) 428, information received from the computing device 402, or other information that enables the computing device 402 to function as described herein. The electronic storage 426 may include one or both of system storage that is provided integrally (i.e., substantially non-removable) with the computing device 402 and/or removable storage that is removably connectable to the computing device 402 via, for example, a port (e.g., a universal serial bus (USB) port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources).

The processing system(s) 428 may be configured to provide information processing capabilities in the computing device 402. As such, the processing system(s) 428 may include one or more of a digital processor, an analog processor, a digital circuit designed to process information, an analog circuit designed to process information, a state machine, and/or other mechanisms for electronically processing information. Although the processing system(s) 428 are illustrated as a single entity, this is for illustrative purposes only. In some embodiments, the processing system(s) 428 may include a plurality of processing units and/or processor cores. The processing units may be physically located within the same device, or processing system(s) 428 may represent processing functionality of a plurality of devices operating in coordination. The processing system(s) 428 may be configured to execute modules 408-416 and/or other modules by software; hardware; firmware; some combination of software, hardware, and/or firmware; and/or other mechanisms for configuring processing capabilities on the processing system(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 408-414 is for illustrative purposes, and is not intended to be limiting, as any of modules 408-414 may provide more or less functionality than is described. For example, one or more of the modules 408-416 may be eliminated, and some or all of its functionality may be provided by other modules 408-416. As another example, the processing system(s) 428 may be configured to execute one or more additional modules that may perform some or all of the functionality of the modules 408-416.

Figure 5A:
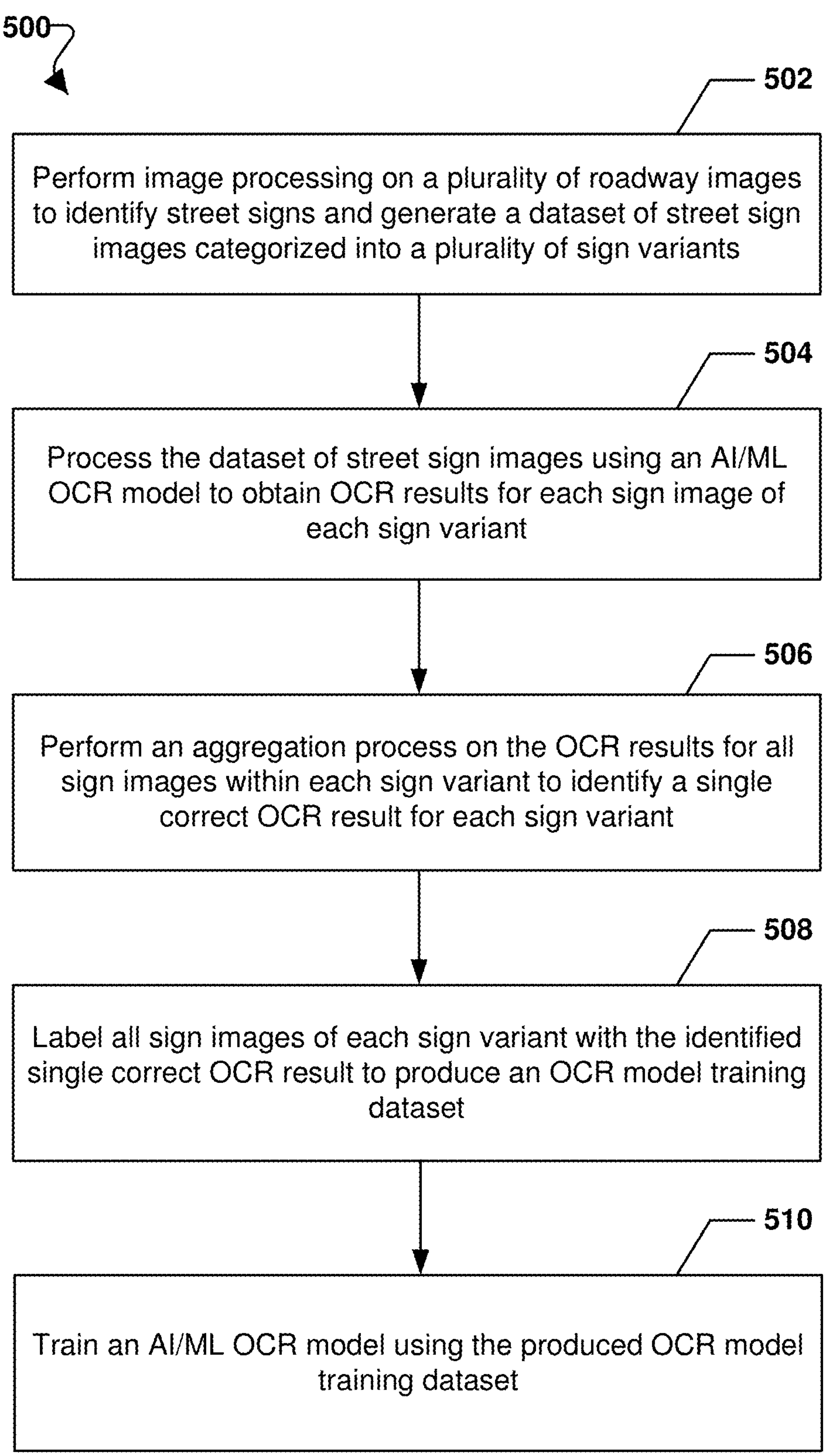
FIGS. 5A-5C are process flow diagrams illustrating example methods for turning a dataset of street sign images into a training dataset for training an artificial intelligence machine learning (AI/ML) optical character recognition (OCR) model according to some embodiments.
Figure 5B:
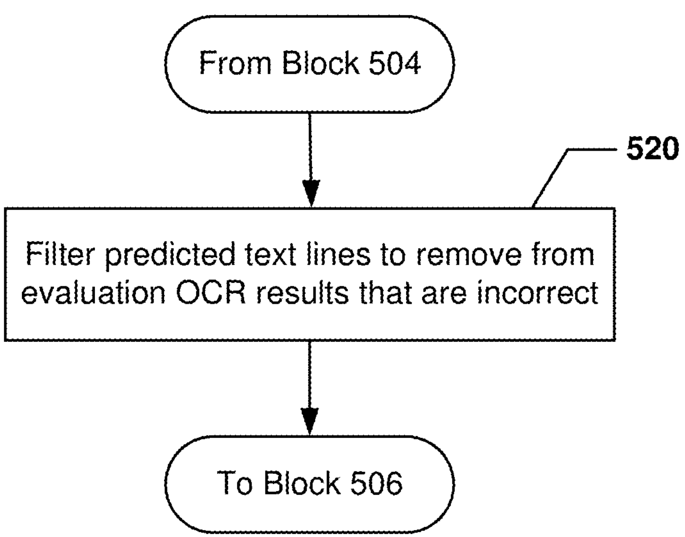
Figure 5C:
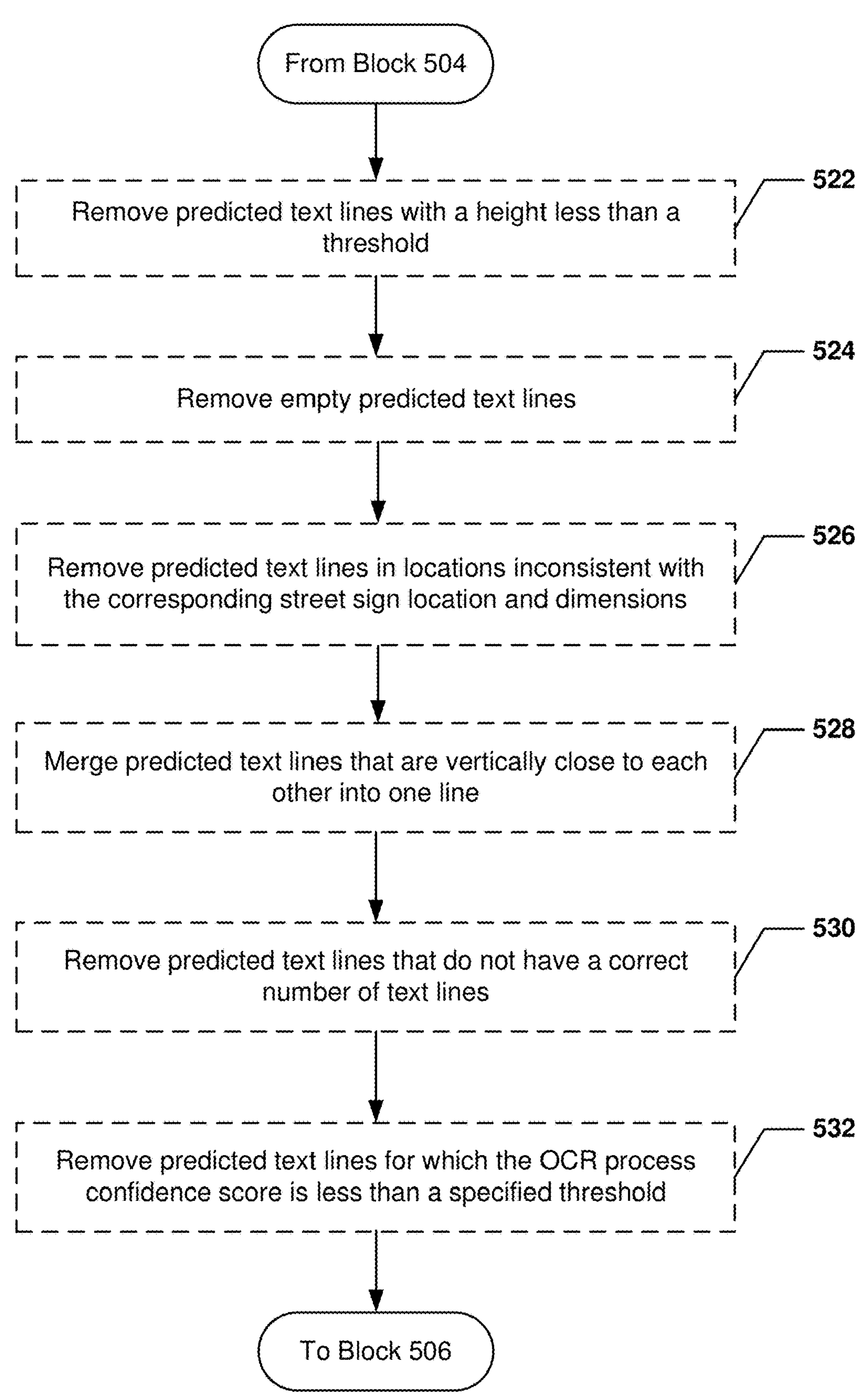

FIGS. 5A-5C illustrate example methods for turning a dataset of street sign images into a training dataset for training an AI/ML OCR model according to some embodiments. With reference to FIGS. 1-5C, the method 500 may be implemented in a processing system of a computing device (e.g., computing device 402), in hardware (e.g., processing system(s) 428), in software (e.g., machine readable instructions 406) executing in a processor within the processing system(s) 428, or in a combination of a software-configured processor and dedicated hardware that includes other individual components. Means for performing functions of the method 500 may include one or more processors within a processing system (e.g., 426) coupled to memory (e.g., 426). In order to encompass the alternative configurations enabled in various embodiments, the hardware implementing the method 500 is referred to herein as a "processor."

In block 502, the processor may perform operations including performing image processing on a plurality of roadway images to identify street signs within the images and generate a dataset of street sign images categorized into a plurality of sign variants, in which each sign variant exhibits same or similar shape, colors, pictograms, and characters. In some embodiments, the processing in block 504 may involve applying edge detection algorithms to locate the boundaries of the sign characters and color-based segmentation methods to distinguish between different sign variants based on their colors. In some embodiments, the processing in block 504 may be performed using an AI/ML image processing model that is trained to recognize street signs in images, apply a bounding box to recognized sign images with coordinates locating each recognized street sign within dimensions of the images (e.g., pixel coordinates), and categorize each sign image as one of a number of variants based on the shape, colors, pictograms, and characters (text or numbers) on the sign.

In some embodiments, the processing in block 502 may filter out, such as by removing from the dataset or not denoting with a bounding box, images in which the street sign is unrecognizable or misshapen such that the sign image cannot be reliably categorized into a variant (e.g., is too dissimilar or differs from a library image by more than a threshold difference). In some embodiments, the processing in block 502 may filter out images in which the street sign does not include characters (i.e., text or numbers), such as signs that only include an arrow, lines indicating crossing, merging or diverging lanes, or other shapes, as such sign images may not contribute to training an OCR model. This filtering may be accomplished by removing the image from the dataset or not denoting the sign with a bounding box, thereby preventing further processing of the street sign in subsequent method operations.

In some embodiments, the processor may perform operations in block 502 that compensate for the apparent orientation and rotation of the sign as viewed by a vehicle camera. In some embodiments, this may be accomplished by an AI/ML model that is trained to estimate the orientation of the street sign, such as the surface normal estimation plus rotation of the sign. The result may be a transformation that can be applied by the processor to the image data to compensate for differences in sign orientation and rotation. This processing may enable the text portion of each street sign used for OCR processing to appear in a uniform coordinate system in which the same line of text in different images appears aligned. This processing may enable the processor to match the lines of text in a simple overlap metric, such as using an intersection-over-union method. Intersection-over-union is a measure used in computer vision to quantify the percent overlap between the predicted bounding box and the ground truth bounding box, calculated by dividing the area of overlap between the boxes by the area of their union. The estimation of the orientation of signs may be informed using LiDAR data, or visual processing models may be trained on images of street signs labeled with orientation information that was obtained using LiDAR data.

In block 504, the processor may perform operations including processing the dataset of street sign images using an AI/ML OCR model to obtain OCR results for each sign image of each sign variant. In some embodiments, processing the dataset of street sign images using an AI/ML OCR model to obtain OCR results for each sign image of each sign variant includes applying the AI/ML OCR model to the characters that appear on each sign image. For example, an AI/ML OCR model may receive street sign images with bounding boxes as an input and output for each image an inference of the most likely text and/or numbers for each text/number line on each sign. In some embodiments, the processing in block 504 may be performed using a fully trained AI/ML OCR model. In some embodiments, the processing in block 504 may be performed using a partially trained AI/ML OCR model.

In block 506, the processor may perform operations including performing an aggregation process on the OCR results for all sign images within each sign variant to identify a single correct OCR result for each sign variant. For example, the processor may perform operations to find the most likely text for each text line in signs of a given variant. In some embodiments, the processor may identify the single correct OCR result for each sign variant by identifying as the single correct OCR result the OCR result produced for a majority of the sign images in each sign variant, using a "majority vote" process. In cases of a tie (i.e., there are two or more OCR results with equal numbers), the processor may select the majority vote OCR result that has the highest confidence scores. In some embodiments, the processor may identify a single correct OCR result for each sign variant using a probability associated with each OCR result, such as using confidence scores. For example, the processor may identify as the single correct OCR result the OCR result with the highest average confidence scores. As another example, the processor may use confidence scores to determine a confidence weighted vote and identify as the single correct OCR result the OCR result with the highest confidence weighted vote score.

In some embodiments, the processing in block 506 may involve the processor matching lines between signs from the same variant. Sometimes street signs within a variant have more than one text line, and sometimes the OCR model only finds and recognizes a subset of the lines in the sign. To accommodate such cases, the processor may be configured to match text lines between signs of a given variant to find the groups of text lines that have the same text. In such operations, the processor may sort text lines to and assign each text line a line number. The processor may then match text lines with the same line number from each sign within the same variant.

In some embodiments, the processing in block 506 may involve the processor utilizing more information to better select the one correct OCR result for a given street sign variant. For example, the text content of each text line may be utilized, such as if the OCR model only finds one text line on a sign that has two text lines, the processor may use the predicted text to match the recognized text to the correct text line. The position of the bounding box on the street sign may also be used by the processor to improve the aggregation process. Since street signs in a variant are similar, the processor may make use of the fact that certain text can be expected to be found in approximately the same position on all signs of that same variant.

In some embodiments, the processing in block 506 may involve the processor clustering text lines based on visual similarity to find the correct matching of OCR results across all street signs in a given variant. This processing may be done in three operations. First, the processor may use a trained neural network to process visual embeddings for the images of the text lines. Second, the processor may use a processing method like principal component analysis (PCA) to reduce the dimensionality of the embeddings. Third, the processor may use a clustering method such as K-Means to cluster the embeddings into clusters, in which each cluster contains embeddings (which may be traced back to sign images) of text lines with the same text. K-Means clustering is a method of vector quantization, originally from signal processing, which aims to partition n observations into k clusters in which each observation belongs to the cluster with the nearest mean, serving as a prototype of the cluster. A neural network that performs these operations may be an off-the-shelf model or neural network model that has been trained in an unsupervised/self-supervised fashion.

In some embodiments, the processing in block 506 may involve the processor comparing OCR results to a dictionary of words that appear on street signs to correct potential spelling errors in the found best text. For example, the processor may select the single best OCR result by finding the closest matching word or words by edit distance to dictionary words. Such a dictionary could be different depending on sign metadata, such as country, language, etc.

In some embodiments, the processing in block 506 may involve the processor using a sequence model, such as a Transformer, RNN or LSTM, that is trained to find the best text. Such a trained model or neural network may process images of all the matched text lines (e.g., cropped from the sign image) and output the best text to be used for all street signs of the same variant. Such a model or neural network may be trained in a self-supervised fashion by augmenting images in which the text is known in different ways to simulate images within a variant and use that as training data. Further, a suitable training dataset (i.e., the images used for training) may be created synthetically to automatically obtain the corresponding labels.

In some embodiments, the processing in block 506 may involve the processor using a pretrained natural language processing (NLP) model to compute word-embeddings for the matched text lines and use a weighted average (or some other arithmetic aggregation) to aggregate the word-embeddings. The weights used in such an NLP model may be the estimated probability from the OCR model. Then aggregated word-embeddings may be compared using cosine similarity against a dictionary of word embeddings to find the best text or labeling sign images of a given variant. After an initial dataset has been created, the processor may perform fine-tuning of the NLP model to learn to adapt to the kinds of mistakes that the OCR model typically makes, such as the OCR model applied in block 504, or an OCR model trained in block 510 as described.

In block 508, the processor may perform operations including automatically labeling all sign images of each sign variant with the identified single correct OCR result to produce an OCR model training dataset. In other words, the processor may apply the selected best text per line text to all signs in the variant to produce an updated dataset. The output of the operations in block 508 may be an updated, fully annotated OCR training dataset that can be used to further train the AI/ML OCR model used in block 504 or other AI/ML OCR models for road sign interpretation.

The labeling of sign images in block 508 may be accomplished automatically (i.e., without requiring human labeling actions) using any standard format for labeling images in AI/ML training datasets. For example, the selected ground truth OCR result (i.e., the OCR result selected in block 506) may be associated with street sign images of the same variant as metadata. As another example, the selected ground truth OCR result may be stored in a data field linked to the corresponding image in the dataset. In some embodiments in which images that were not recognized or classified in the operations of block 502 remain in the dataset, such images may not be labeled in block 508 to avoid assigning incorrect or misleading information to those images.

In block 510, the processor may perform operations including training an AI/ML OCR model using the produced OCR model training dataset. The operations in block 510 may involve training a deep learning-based OCR model, such as a Convolutional Neural Network (CNN) model or a Recurrent Neural Network (RNN) model, on the large dataset of labeled street sign images produced in blocks 502-508. In this training, the OCR model "learns" to recognize text and numbers in various street sign configurations and viewing angles/conditions by analyzing patterns and contextual information present in the training data using the ground truth OCR result labels applied in block 508. In some embodiments, training an AI/ML OCR model using the OCR model training dataset may include further training, retraining or finetuning of the partially trained AI/ML OCR model using the produced OCR model training dataset. In some embodiments, training an AI/ML OCR model using the OCR model training dataset may include training a different AI/ML OCR model using the produced OCR model training dataset.

Referring to FIG. 5B, in some embodiments, the processor may perform a filtering operation in block 520 on the OCR output of predicted text lines generated in block 504 (which is the combination of the OCR text, a bounding box on the text generated in the OCR process, and a confidence score from the OCR process). This filtering may remove from further evaluation OCR results that are clearly incorrect before the aggregation process in block 506 is performed. Such filtering may be configured to improve the quality and therefore the outcome and reliability of the aggregation process. Filtering operations performed by the processor in block 520 may permit the operations involved in the aggregation process of block 506 to be simplified. By removing predicted text line data that is obviously spurious (e.g., based on unofficial markings, graffiti, or defects), blank or empty, or inconsistent with expected sign text (e.g., not within a dictionary or lexicon of street signs), the aggregation process in block 506 does not have to be configured to accommodate or account for such cases. Some nonlimiting examples of filtering operations that may be performed by the processor in block 520 are described with reference to FIG. 5C.

Referring to FIG. 5C, the filtering operations that may be performed by the processor in block 520 may include one or more of the optional filtering operations 522-532, which may be performed individually, sequentially or in any order on the OCR output of predicted text lines generated in block 504. The term "predicted text line" is used herein to refer to the combination of the OCR output text, the bounding box on the sign image applied in the OCR process to generate the output text, and a confidence score associated with the output text based on the OCR processing.

In optional block 522, the processor may perform a filtering operation that involves removing predicted text lines that have a height that is less than a threshold value. This filtering may remove from consideration any OCR text output that was based upon visible features on a street sign that are smaller than the size of legitimate text expected on a street sign variant. For example, this filtering operation may eliminate from further processing text that was based on graffiti or minor text (e.g., agency information, serial numbers, etc.), as well as text that was recognized based on dirt or defects in the sign.

In optional block 524, the processor may perform a filtering operation that involves removing predicted text lines that are empty, such as not including any letters or number (e.g., a space, dash, period, comma, etc.). This operation may remove from aggregation processing those predicted text lines that do not include meaningful sign information.

In optional block 526, the processor may perform a filtering operation that involves removing predicted text lines that are in locations that are inconsistent with the corresponding street sign location and dimensions. For example, this operation may remove from aggregation processing any predicted text lines that have or were derived from a bounding box that is or extends outside the dimensions of the street sign (e.g., above, below, or to either side). This operation may remove from aggregation processing predicted text lines that are spurious or based on text that is not on the street sign (e.g., a poster or flyer attached to the signpost below the sign).

In optional block 528, the processor may perform a filtering operation that involves merging into one line predicted text lines that are vertically close to each other. For example, this operation may enable aggregation processing of text that appears in two or more lines as a single line of text. This operation may enable the aggregation processing to accommodate text that appears in one line on some signs and two or more lines on other signs of the same variant.

In optional block 530, the processor may perform a filtering operation that involves removing predicted text lines that do not have a correct number of text lines. For example, this operation may remove from aggregation processing any predicted text lines that have too many lines of text for a given sign variant, such as two or more lines of text when the sign variant is for a single word (e.g., "stop") or number. This operation may remove from aggregation processing predicted text lines that are inappropriate for the street sign variant, such as a poster or flyer attached to the sign.

In optional block 532, the processor may perform a filtering operation that involves removing predicted text lines for which the OCR process confidence score is less than a specified threshold. For example, this operation may remove from aggregation processing any predicted text lines in which the associated confidence score is low, such as less than the mean of all predicted text lines of signs of a given variant. This operation may remove from aggregation processing predicted text lines that are most likely inaccurate, which could distort aggregation processing.

Figure 6:
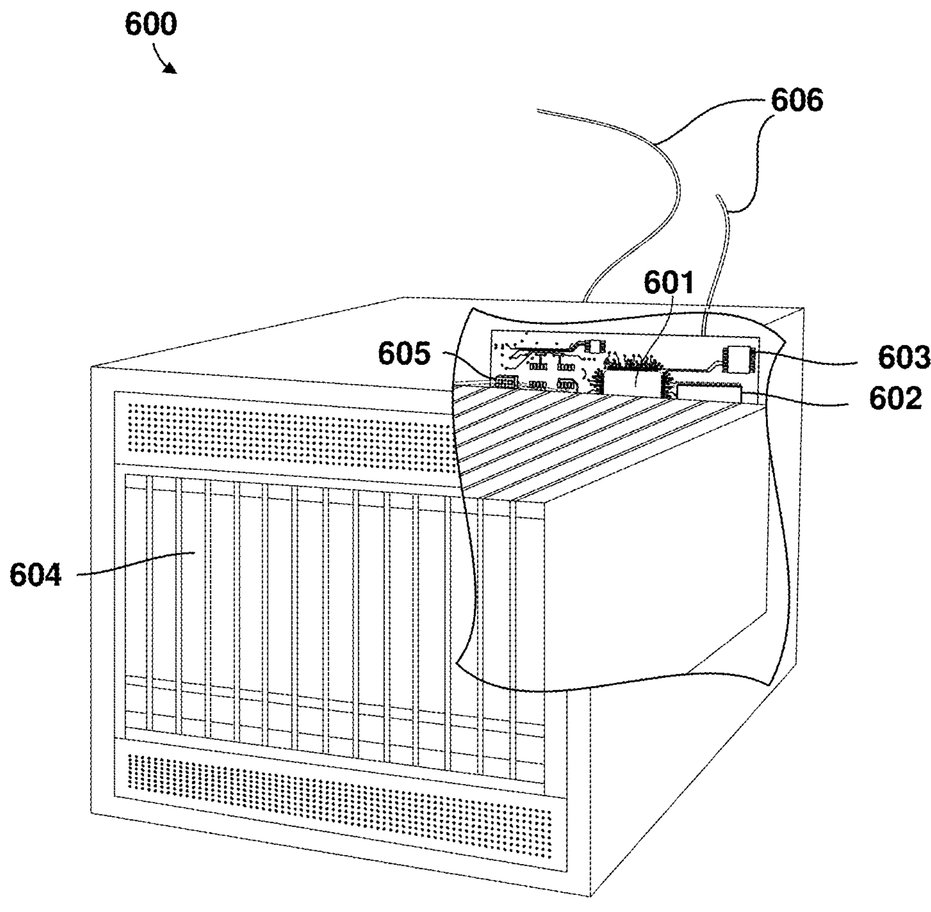
FIG. 6 is a component block diagram illustrating an example general purpose computing system suitable for implementing various embodiments.

Various embodiments (including, but not limited to, embodiments described above with reference to FIGS. 1-5C) may be implemented in fixed computing systems, such as any of a variety of generalized or specialize computing systems, an example of which in the form of a server computing system 600 is illustrated in FIG. 6. A server computing system 600 typically includes one or more multicore processor systems 601 coupled to volatile memory 602 and a large capacity nonvolatile memory, such as a non-volatile disk drive 604. The processing systems 601 may include or be coupled to specialized processors 603 configured to perform calculations involved in neural network processing and machine learning such as graphical processing units (GPU), neural network processors and the like. In some implementations, multiple processing system and memory units 604 may be implemented within the computing system 600, such as to permit parallel processing and segmented processing of input data (e.g., image datasets) according to various embodiments. The server computing system 600 may also include network access ports 605 coupled to the multicore processor assemblies 601 for establishing network interface connections with a network 606, such as a local area network, the Internet, and other networks, such as for receiving image datasets and exporting completed OCR model training datasets.

Implementation examples are described in the following paragraphs. While some of the following implementation examples are described in terms of example systems, devices, or methods, further example implementations may include: the example systems or devices discussed in the following paragraphs implemented as a method executing operations of the example systems or devices; the example systems, devices, or methods discussed in the following paragraphs implemented by a computing device comprising a processing device and/or a memory subsystem scan dump device configured with processing device-executable instructions to perform operations of the example systems, devices, or methods; the example systems, devices, or methods discussed in the following paragraphs implemented by a memory subsystem scan dump device configured to perform operations of the example systems, devices, or methods; the example systems, devices, or methods discussed in the following paragraphs implemented by a computing device comprising a memory subsystem scan dump device configured to perform operations of the example systems, devices, or methods; the example systems, devices, or methods discussed in the following paragraphs implemented by a computing device including means for performing functions of the example systems, devices, or methods; and the example systems, devices, or methods discussed in the following paragraphs implemented as a non-transitory processor-readable storage medium having stored thereon processor-executable instructions configured to cause a processor of a computing device to perform the operations of the example systems, devices, or methods.

Example 1. A method of turning a dataset of street sign images into a training dataset for training an artificial intelligence machine learning (AI/ML) optical character recognition (OCR) model, including: performing image processing on a plurality of roadway images to identify street signs within the images and generate a dataset of street sign images categorized into a plurality of sign variants, in which each sign variant exhibits same or similar shape, colors, pictograms, and characters; processing the dataset of street sign images using an AI/ML OCR model to obtain OCR results for each sign image of each sign variant; performing an aggregation process on the OCR results for all sign images within each sign variant to identify a single correct OCR result for each sign variant; automatically labeling all sign images of each sign variant with the identified single correct OCR result to produce an OCR model training dataset; and training an AI/ML OCR model using the produced OCR model training dataset.

Example 2. The method of claim 1, in which: performing image processing on a plurality of roadway images to identify street signs within the images includes applying a bounding box that encompasses each sign image; and processing the dataset of street sign images using an AI/ML OCR model to obtain OCR results for each sign image of each sign variant includes applying the AI/ML OCR model to characters that appear within each sign image bounding box.

Example 3. The method of claim 1, in which: processing the dataset of street sign images using the AI/ML OCR model to obtain OCR results for each sign images of each sign variant includes processing the dataset of street sign images using a partially trained AI/ML OCR model; and training an AI/ML OCR model using the OCR model training dataset includes further training the partially trained AI/ML OCR model using the produced OCR model training dataset.

Example 4. The method of claim 1, in which performing the aggregation process on the OCR results for all sign images within each sign variant to identify a single correct OCR result for each sign variant includes identifying as the single correct OCR result the OCR result produced for a majority of the sign images in each sign variant.

Example 5. The method of claim 1, in which performing the aggregation process on the OCR results for all sign images within each sign variant to identify a single correct OCR result for each sign variant includes using a probability associated with each OCR result to identify the single correct OCR result for each sign variant.

Example 6. The method of claim 1, further including filtering the OCR results obtained for each sign image of each sign variant to remove from further evaluation OCR results that are incorrect.

Example 7. The method of claim 1, in which: processing the dataset of street sign images using the AI/ML OCR model to obtain OCR results for each sign images of each sign variant includes processing the dataset of street sign images using a fully trained AI/ML OCR model; and training an AI/ML OCR model using the OCR model training dataset includes training a different AI/ML OCR model using the produced OCR model training dataset.

Example 8. The method of claim 1, in which processing the dataset of street sign images using the AI/ML OCR model to obtain OCR results for each sign images of each sign variant includes using a trained neural network to process visual embeddings for the images of text lines on sign images, using principal component analysis (PCA) to reduce dimensionality of the embeddings, and clustering the embeddings into clusters of text lines with the same text.

Example 9. The method of claim 1, in which performing the aggregation process on the OCR results for all sign images within each sign variant to identify a single correct OCR result for each sign variant includes comparing OCR results to a dictionary of words that appear on street signs.

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method of turning a dataset of street sign images into a training dataset for training an artificial intelligence machine learning (AI/ML) optical character recognition (OCR) model, comprising:
performing image processing on a plurality of roadway images to identify street signs within the images and generate a dataset of street sign images categorized into a plurality of sign variants, in which each sign variant exhibits same or similar shape, colors, pictograms, and characters;
processing the dataset of street sign images using an AI/ML OCR model to obtain OCR results for each sign image of each sign variant;
performing an aggregation process on the OCR results for all sign images within each sign variant to identify a single correct OCR result for each sign variant, wherein each single correct OCR result comprises text;
automatically labeling all sign images of each sign variant with the identified single correct OCR result to produce an OCR model training dataset; and
training the AI/ML OCR model using the produced OCR model training dataset.

2. The method of claim 1, wherein:
performing image processing on a plurality of roadway images to identify street signs within the images includes applying a bounding box that encompasses each sign image; and
processing the dataset of street sign images using the AI/ML OCR model to obtain OCR results for each sign image of each sign variant includes applying the AI/ML OCR model to characters that appear within each sign image bounding box.

3. The method of claim 1, wherein the AI/ML OCR model is partially trained.

4. The method of claim 1, wherein performing the aggregation process on the OCR results for all sign images within each sign variant to identify a single correct OCR result for each sign variant includes identifying as the single correct OCR result the OCR result produced for a majority of the sign images in each sign variant.

5. The method of claim 1, wherein performing the aggregation process on the OCR results for all sign images within each sign variant to identify a single correct OCR result for each sign variant includes using a probability associated with each OCR result to identify the single correct OCR result for each sign variant.

6. The method of claim 1, further comprising filtering the OCR results obtained for each sign image of each sign variant to remove from further evaluation OCR results that are incorrect.

7. The method of claim 1, wherein the AI/ML OCR model is a fully trained AI/ML OCR model.

8. The method of claim 1, wherein processing the dataset of street sign images using the AI/ML OCR model to obtain OCR results for each sign images of each sign variant includes using a trained neural network to process visual embeddings for the images of text lines on sign images, using principal component analysis (PCA) to reduce dimensionality of the embeddings, and clustering the embeddings into clusters of text lines with the same text.

9. The method of claim 1, wherein performing the aggregation process on the OCR results for all sign images within each sign variant to identify a single correct OCR result for each sign variant includes comparing OCR results to a dictionary of words that appear on street signs.

10. A computing system, comprising:
a memory; and
a processing system coupled to the memory and including one or more processors configured to:
perform image processing on a plurality of roadway images to identify street signs within the images and generate a dataset of street sign images categorized into a plurality of sign variants, in which each sign variant exhibits same or similar shape, colors, pictograms, and characters;
process the dataset of street sign images using an artificial intelligence machine learning (AI/ML) optical character recognition (OCR) model to obtain OCR results for each sign image of each sign variant;
perform an aggregation process on the OCR results for all sign images within each sign variant to identify a single correct OCR result for each sign variant, wherein each single correct OCR result comprises text;
automatically label all sign images of each sign variant with the identified single correct OCR result to produce an OCR model training dataset; and
train the AI/ML OCR model using the produced OCR model training dataset.

11. The computing system of claim 10, wherein the one or more processors are further configured to:
apply a bounding box that encompasses each sign image; and
apply the AI/ML OCR model to characters that appear within each sign image bounding box.

12. The computing system of claim 10, wherein the AI/ML OCR model a partially trained AI/ML OCR model.

13. The computing system of claim 10, wherein the one or more processors are further configured to identify as the single correct OCR result the OCR result produced for a majority of the sign images in each sign variant.

14. The computing system of claim 10, wherein the one or more processors are further configured to use a probability associated with each OCR result to identify the single correct OCR result for each sign variant.

15. The computing system of claim 10, wherein the one or more processors are further configured to filter the OCR results obtained for each sign image of each sign variant to remove from further evaluation OCR results that are incorrect.

16. The computing system of claim 10, wherein the AI/ML OCR model is a fully trained AI/ML OCR model; and train a different AI/ML OCR model using the produced OCR model training dataset.

17. The computing system of claim 10, wherein the one or more processors are further configured to process the dataset of street sign images using the AI/ML OCR model to obtain OCR results for each sign image of each sign variant by using a trained neural network to process visual embeddings for the images of text lines on sign images, using principal component analysis (PCA) to reduce dimensionality of the embeddings, and clustering the embeddings into clusters of text lines with the same text.

18. The computing system of claim 10, wherein the one or more processors are further configured to compare OCR results to a dictionary of words that appear on street signs to identify the single correct OCR result for each sign variant.

19. A non-transitory processor-readable medium having stored thereon processor-executable instructions configured to cause one or more processors of a computing system to perform operations comprising:

performing image processing on a plurality of roadway images to identify street signs within the images and generate a dataset of street sign images categorized into a plurality of sign variants, in which each sign variant exhibits same or similar shape, colors, pictograms, and characters;

processing the dataset of street sign images using an artificial intelligence machine learning (AI/ML) optical character recognition (OCR) model to obtain OCR results for each sign image of each sign variant;

performing an aggregation process on the OCR results for all sign images within each sign variant to identify a single correct OCR result for each sign variant, wherein each single correct OCR result comprises text;

automatically labeling all sign images of each sign variant with the identified single correct OCR result to produce an OCR model training dataset; and training the AI/ML OCR model using the produced OCR model training dataset.

20. The non-transitory processor-readable medium of claim 19, wherein AI/ML OCR model is a partially trained AI/ML OCR model.

* * * * *